US010361423B2

(12) United States Patent
Shen et al.

(10) Patent No.: US 10,361,423 B2
(45) Date of Patent: Jul. 23, 2019

(54) METHOD OF PREPARING BATTERY ELECTRODES

(71) Applicant: GRST International Limited, Hong Kong (CN)

(72) Inventors: Peihua Shen, Guangzhou (CN); Sing Hung Eric Wong, Hong Kong (CN)

(73) Assignee: GRST INTERNATIONAL LIMITED, Hong Kong (CN)

(*) Notice: Subject to any disclaimer, the term of this patent is extended or adjusted under 35 U.S.C. 154(b) by 0 days.

(21) Appl. No.: 15/220,404

(22) Filed: Jul. 27, 2016

(65) Prior Publication Data
US 2017/0207441 A1    Jul. 20, 2017

Related U.S. Application Data

(60) Provisional application No. 62/279,841, filed on Jan. 18, 2016.

(51) Int. Cl.
*H01M 4/04* (2006.01)
*H01M 4/48* (2010.01)
(Continued)

(52) U.S. Cl.
CPC ....... *H01M 4/0404* (2013.01); *H01M 4/0419* (2013.01); *H01M 4/0471* (2013.01); *H01M 4/131* (2013.01); *H01M 4/139* (2013.01); *H01M 4/1391* (2013.01); *H01M 4/1397* (2013.01); *H01M 4/483* (2013.01); *H01M 4/485* (2013.01); *H01M 4/502* (2013.01); *H01M 4/505* (2013.01); *H01M 4/523* (2013.01); *H01M 4/525* (2013.01); *H01M 4/5825* (2013.01);
(Continued)

(58) Field of Classification Search
CPC combination set(s) only.
See application file for complete search history.

(56) References Cited

U.S. PATENT DOCUMENTS 7,964,309 B2   6/2011   Kuwahara et al.
8,092,557 B2   1/2012   Muthu et al.
(Continued)

FOREIGN PATENT DOCUMENTS

CN   1505185 A   6/2004
CN   1815777 A   8/2006
(Continued)

OTHER PUBLICATIONS

Wang et al. "Preparation and characterization of nano-sized LiFePO4 by low heating solid-state coordination method and microwave heating" (2007).*
(Continued)

*Primary Examiner* — Austin Murata
(74) *Attorney, Agent, or Firm* — Squire Patton Boggs (US) LLP

(57) ABSTRACT

Provided herein is a method for preparing a battery electrode based on an aqueous slurry. The method disclosed herein has the advantage that an aqueous solvent can be used in the manufacturing process, which can save process time and facilities by avoiding the need to handle or recycle hazardous organic solvents. Therefore, costs are reduced by simplifying the total process. In addition, the batteries having the electrodes prepared by the method disclosed herein show impressive energy retention.

29 Claims, 6 Drawing Sheets

(51) Int. Cl.
*H01M 4/485* (2010.01)
*H01M 4/50* (2010.01)
*H01M 4/505* (2010.01)
*H01M 4/52* (2010.01)
*H01M 4/525* (2010.01)
*H01M 4/62* (2006.01)
*H01M 4/139* (2010.01)
*H01M 4/1391* (2010.01)
*H01M 4/131* (2010.01)
*H01M 4/1397* (2010.01)
*H01M 4/58* (2010.01)
*H01M 10/0525* (2010.01)
*H01M 4/02* (2006.01)
*H01M 4/1393* (2010.01)

(52) U.S. Cl.
CPC ........... *H01M 4/622* (2013.01); *H01M 4/623* (2013.01); *H01M 4/625* (2013.01); *H01M 4/0409* (2013.01); *H01M 4/1393* (2013.01); *H01M 10/0525* (2013.01); *H01M 2004/028* (2013.01)

(56) References Cited

U.S. PATENT DOCUMENTS

| | | | |
|---|---|---|---|
| 8,153,302 B2 | 4/2012 | Yu et al. | |
| 8,541,136 B2 | 9/2013 | Beck et al. | |
| 8,652,688 B2 | 2/2014 | Yushin et al. | |
| 8,772,174 B2 | 7/2014 | Green et al. | |
| 8,956,688 B2 | 2/2015 | Li et al. | |
| 9,368,831 B2 | 6/2016 | He et al. | |
| 9,728,783 B2 | 8/2017 | Sun et al. | |
| 2004/0229126 A1 | 11/2004 | Matsumoto et al. | |
| 2005/0175903 A1 | 8/2005 | Kim et al. | |
| 2009/0291366 A1* | 11/2009 | Stevanovic | H01M 4/1397 429/221 |
| 2011/0039160 A1* | 2/2011 | Takahata | H01M 2/34 429/231.1 |
| 2011/0229760 A1 | 9/2011 | Hidaka et al. | |
| 2012/0064407 A1 | 3/2012 | Muthu et al. | |
| 2012/0135278 A1 | 5/2012 | Yoshie et al. | |
| 2012/0225199 A1 | 9/2012 | Muthu et al. | |
| 2013/0034651 A1 | 2/2013 | Buqa et al. | |
| 2013/0091722 A1* | 4/2013 | Lam | F26B 3/347 34/265 |
| 2013/0183579 A1 | 7/2013 | Kim et al. | |
| 2014/0065480 A1* | 3/2014 | Yoshida | H01M 4/133 429/220 |
| 2014/0295273 A1* | 10/2014 | Mah | H01M 4/0471 429/220 |
| 2015/0210557 A1* | 7/2015 | Song | H01M 4/525 429/223 |
| 2015/0221929 A1* | 8/2015 | Lu | H01M 4/0404 429/218.1 |
| 2015/0263376 A1* | 9/2015 | Kondo | H01M 10/0431 429/94 |
| 2015/0325838 A1 | 11/2015 | Tamaki et al. | |
| 2015/0359751 A1* | 12/2015 | Lee | A61K 49/225 424/9.5 |
| 2016/0118661 A1* | 4/2016 | Oshitari et al. | H01M 4/5825 252/182.1 |
| 2016/0197346 A1* | 7/2016 | Myung | H01M 4/0404 429/223 |
| 2016/0197387 A1* | 7/2016 | Lee | H01M 10/653 429/120 |
| 2016/0211512 A1* | 7/2016 | Sugiyama | H01G 11/06 |

FOREIGN PATENT DOCUMENTS

| | | |
|---|---|---|
| CN | 103400978 A | 11/2013 |
| CN | 103618063 A | 3/2014 |
| CN | 203731822 U | 7/2014 |
| JP | 2003017054 A | 1/2003 |
| JP | 2007176767 A | 7/2007 |

OTHER PUBLICATIONS

International Search Report and Written Opinion of PCT Application No. PCT/CN2016/109723.
Eng. translation, Eng translation of the abstract of CN1505185 A.
Eng. translation, Eng translation of the abstract of CN103618063 A.
Eng. translation, Eng translation of the abstract of CN1815777 A.
Kelham, S., "Acid, Soft Water and Sulfate Attack", 2003, p. 1-12.
Eng. translation, Eng. translation of the abstract of JP2003017054A.
Eng. translation, Eng. translation of the abstract of CN 203731822U.
Eng. translation, Eng. translation of the abstract of JP 2007176767A.
Eng. translation, Eng. translation of the abstract of CN 103400978A.

* cited by examiner

METHOD OF PREPARING BATTERY ELECTRODES

FIELD OF THE INVENTION

This invention relates to lithium-ion batteries in the application of sustainable energy area. More particularly, this invention relates to the use of aqueous-based slurries for preparing battery electrodes.

BACKGROUND OF THE INVENTION

Lithium-ion batteries (LIBs) have attracted extensive attention in the past two decades for a wide range of applications in portable electronic devices such as cellular phones and laptop computers. Due to rapid market development of electric vehicles (EV) and grid energy storage, high-performance, low-cost LIBs are currently offering one of the most promising options for large-scale energy storage devices.

In general, a lithium ion battery includes a separator, a cathode and an anode. Currently, electrodes are prepared by dispersing fine powders of an active battery electrode material, a conductive agent, and a binder material in an appropriate solvent. The dispersion can be coated onto a current collector such as a copper or aluminum metal foil, and then dried at an elevated temperature to remove the solvent. Sheets of the cathode and anode are subsequently stacked or rolled with the separator separating the cathode and anode to form a battery.

Polyvinylidene fluoride (PVDF) has been the most widely used binder materials for both cathode and anode electrodes. Compared to non-PVDF binder materials, PVDF provides a good electrochemical stability and high adhesion to the electrode materials and current collectors. However, PVDF can only dissolve in some specific organic solvents such as N-Methyl-2-pyrrolidone (NMP) which requires specific handling, production standards and recycling of the organic solvents in an environmentally-friendly way. This will incur significant costs in the manufacturing process.

The use of aqueous solutions instead of organic solvents is preferred for environmental and handling reasons and therefore water-based slurries have been considered. Water soluble binders such as carboxymethyl cellulose (CMC) and styrene-butadiene rubber (SBR) have been attempted. However, CMC and SBR are generally limited to anode applications.

U.S. Pat. No. 8,956,688 B2 describes a method of making a battery electrode. The method comprises measuring the zeta potential of the active electrode material and the conductive additive material; selecting a cationic or anionic dispersant based on the zeta potential; determining the isoelectric point (IEP) of the active electrode material and the conductive additive material; dispersing an active electrode material and a conductive additive in water with at least one dispersant to create a mixed dispersion; treating a surface of a current collector to raise the surface energy of the surface to at least the surface tension of the mixed dispersion; depositing the dispersed active electrode material and conductive additive on a current collector; and heating the coated surface to remove water from the coating. However, the method is complicated, involving measurements of the zeta potential of the active electrode material and the conductive additive material, and isoelectric point (IEP) of the active electrode material and the conductive additive material. Furthermore, an additional surface treatment step for treating the surface of the current collector is required in order to enhance the capacity retention.

U.S. Pat. No. 8,092,557 B2 describes a method of making an electrode for a rechargeable lithium ion battery using a water-based slurry having a pH between 7.0 and 11.7, wherein the electrode includes an electro-active material, a (polystyrenebutadiene rubber)-poly (acrylonitrile-co-acrylamide) polymer, and a conductive additive. However, this method does not provide any data for evaluating the electrochemical performance of the electrodes prepared by this method.

U.S. Patent Application No. 2013/0034651 A1 describes a slurry for the manufacture of an electrode, wherein the slurry comprises a combination of at least three of polyacrylic acid (PAA), carboxymethyl cellulose (CMC), styrene-butadiene rubber (SBR) and polyvinylidene fluoride (PVDF) in an aqueous solution and an electrochemically activatable compound. However, the slurry for preparing the cathode electrode comprises acetone or other organic solvents such as NMP and DMAC.

In view of the above, there is always a need to develop a method for preparing cathode and anode electrodes for lithium-ion battery using a simple, inexpensive and environmentally friendly method.

SUMMARY OF THE INVENTION

The aforementioned needs are met by various aspects and embodiments disclosed herein.

In one aspect, provided herein is a method of preparing a battery electrode, comprising the steps of:

1) pre-treating an active battery electrode material in a first aqueous solution having a pH from about 2.0 to about 7.5 to form a first suspension;

2) drying the first suspension to obtain a pre-treated active battery electrode material;

3) dispersing the pre-treated active battery electrode material, a conductive agent, and a binder material in a second aqueous solution to form a slurry;

4) homogenizing the slurry by a homogenizer to obtain a homogenized slurry;

5) applying the homogenized slurry on a current collector to form a coated film on the current collector; and 6) drying the coated film on the current collector to form the battery electrode.

In certain embodiments, the active battery electrode material is a cathode material, wherein the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.3 to 0.8; each y is independently from 0.1 to 0.45; and each z is independently from 0 to 0.2.

In some embodiments, the pH of the first aqueous solution is at a range from about 4 to about 7 and the first suspension is stirred for a time period from about 2 minutes to about 12 hours. In further embodiments, the first aqueous solution comprises one or more acids selected from the group consisting of $H_2SO_4$, $HNO_3$, $H_3PO_4$, HCOOH, $CH_3COOH$, $H_3C_6H_5O_7$, $H_2C_2O_4$, $C_6H_{12}O_7$, $C_4H_6O_5$, and combinations thereof.

In certain embodiments, the first aqueous solution further comprises ethanol, isopropanol, methanol, acetone, n-propanol, t-butanol, or a combination thereof.

In some embodiments, the first suspension is dried by a double-cone vacuum dryer, a microwave dryer, or a microwave vacuum dryer.

In certain embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

In some embodiments, the conductive agent is pre-treated in an alkaline solution or a basic solution for a time period from about 30 minutes to about 2 hours, wherein the alkaline solution or basic solution comprises a base selected from the group consisting of $H_2O_2$, LiOH, NaOH, KOH, $NH_3.H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, and combinations thereof.

In certain embodiments, the conductive agent is dispersed in a third aqueous solution to form a second suspension prior to step 3).

In some embodiments, the binder material is selected from the group consisting of styrene-butadiene rubber (SBR), carboxymethyl cellulose (CMC), polyvinylidene fluoride (PVDF), acrylonitrile copolymer, polyacrylic acid (PAA), polyacrylonitrile, poly(vinylidene fluoride)-hexafluoropropene (PVDF-HFP), latex, a salt of alginic acid, and combinations thereof. In further embodiments, the salt of alginic acid comprises a cation selected from Na, Li, K, Ca, $NH_4$, Mg, Al, or a combination thereof.

In some embodiments, the binder material is dissolved in a fourth aqueous solution to form a resulting solution prior to step 3).

In certain embodiments, each of the first, second, third and fourth aqueous solutions independently is purified water, pure water, de-ionized water, distilled water, or a combination thereof.

In some embodiments, the slurry or homogenized slurry further comprises a dispersing agent selected from the group consisting of ethanol, isopropanol, n-propanol, t-butanol, n-butanol, lithium dodecyl sulfate, trimethylhexadecyl ammonium chloride, alcohol ethoxylate, nonylphenol ethoxylate, sodium dodecylbenzene sulfonate, sodium stearate, and combinations thereof.

In certain embodiments, the homogenizer is a stirring mixer, a blender, a mill, an ultrasonicator, a rotor-stator homogenizer, or a high pressure homogenizer.

In some embodiments, the ultrasonicator is a probe-type ultrasonicator or an ultrasonic flow cell.

In certain embodiments, the ultrasonicator is operated at a power density from about 10 W/L to about 100 W/L, or from about 20 W/L to about 40 W/L.

In some embodiments, the homogenized slurry is applied on the current collector using a doctor blade coater, a slot-die coater, a transfer coater, or a spray coater.

In certain embodiments, each of the current collectors of the positive and negative electrodes is independently stainless steel, titanium, nickel, aluminum, copper or electrically-conductive resin. In certain embodiments, the current collector of the positive electrode is an aluminum thin film. In some embodiments, the current collector of the negative electrode is a copper thin film.

In some embodiments, the coated film is dried for a time period from about 1 minute to about 30 minutes, or from about 2 minutes to about 10 minutes at a temperature from about 45° C. to about 100° C., or from about 55° C. to about 75° C.

In certain embodiments, the coated film is dried by a conveyor hot air drying oven, a conveyor resistance drying oven, a conveyor inductive drying oven, or a conveyor microwave drying oven.

In some embodiments, the conveyor moves at a speed from about 2 meter/minute to about 30 meter/minute, from about 2 meter/minute to about 25 meter/minute, from about 2 meter/minute to about 20 meter/minute, from about 2 meter/minute to about 16 meter/minute, from about 3 meter/minute to about 30 meter/minute, from about 3 meter/minute to about 20 meter/minute, or from about 3 meter/minute to about 16 meter/minute.

In certain embodiments, the active battery electrode material is an anode material, wherein the anode material is selected from the group consisting of natural graphite particulate, synthetic graphite particulate, Sn particulate, $Li_4Ti_5O_{12}$ particulate, Si particulate, Si—C composite particulate, and combinations thereof.

DETAILED DESCRIPTION OF THE INVENTION

Figure 1:
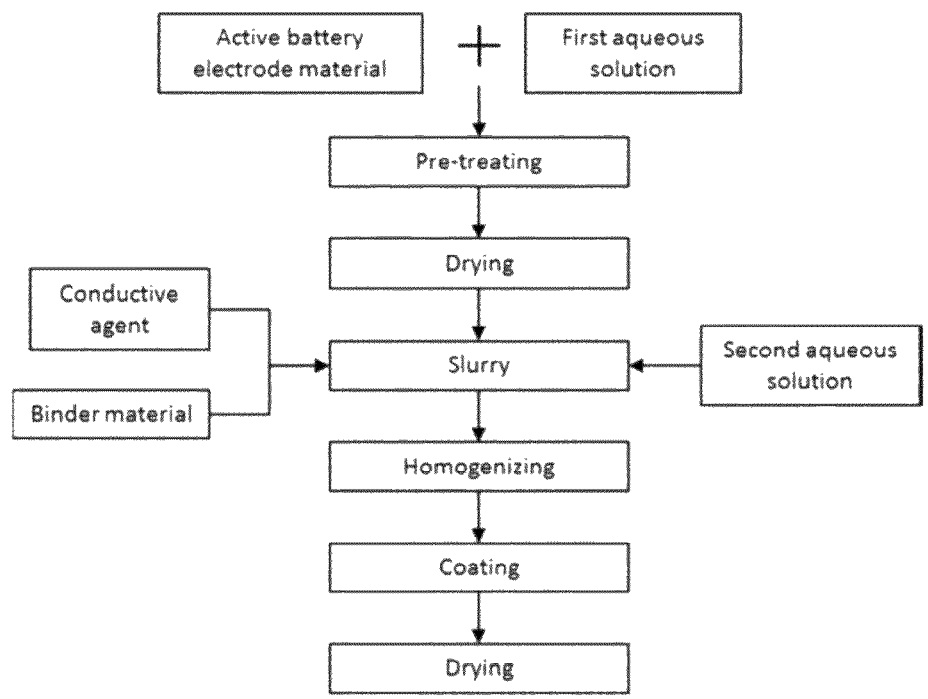
FIG. 1 depicts an embodiment of the method disclosed herein.

Provided herein is a method of preparing a battery electrode, comprising the steps of:

1) pre-treating an active battery electrode material in a first aqueous solution having a pH from about 2.0 to about 7.5 to form a first suspension;

2) drying the first suspension to obtain a pre-treated active battery electrode material;

3) dispersing the pre-treated active battery electrode material, a conductive agent, and a binder material in a second aqueous solution to form a slurry;

4) homogenizing the slurry by a homogenizer to obtain a homogenized slurry;

5) applying the homogenized slurry on a current collector to form a coated film on the current collector; and 6) drying the coated film on the current collector to form the battery electrode.

The term "electrode" refers to a "cathode" or an "anode."

The term "positive electrode" is used interchangeably with cathode. Likewise, the term "negative electrode" is used interchangeably with anode.

The term "acid" includes any molecule or ion that can donate a hydrogen ion to another substance, and/or contain completely or partially displaceable $H^+$ ions. Some non-limiting examples of suitable acids include inorganic acids and organic acids. Some non-limiting examples of the inorganic acid include hydrochloric acid, nitric acid, phosphoric acid, sulfuric acid, boric acid, hydrofluoric acid, hydrobromic acid, perchloric acid, hydroiodic acid, and combinations thereof. Some non-limiting examples of the organic acids include acetic acid, lactic acid, oxalic acid, citric acid, uric acid, trifluoroacetic acid, methanesulfonic acid, formic acid, propionic acid, butyric acid, valeric acid, gluconic acid, malic acid, caproic acid, and combinations thereof.

The term "acidic solution" refers to a solution of a soluble acid, having a pH lower than 7.0, lower than 6.5, lower than 6.0, lower than 5.0, lower than 4.0, lower than 3.0, or lower than 2.0. In some embodiments, the pH is greater than 6.0, greater than 5.0, greater than 4.0, greater than 3.0, or greater than 2.0.

The term "pre-treating" as used herein refers to an act of improving or altering the properties of a material, or removing any contaminants in a material by acting upon with some agents, or an act of suspending a material in some solvents.

The term "dispersing" as used herein refers to an act of distributing a chemical species or a solid more or less evenly throughout a fluid.

The term "binder material" refers to a chemical or a substance that can be used to hold the active battery electrode material and conductive agent in place.

The term "homogenizer" refers to an equipment that can be used for homogenization of materials. The term "homogenization" refers to a process of reducing a substance or material to small particles and distributing it uniformly throughout a fluid. Any conventional homogenizers can be used for the method disclosed herein. Some non-limiting examples of the homogenizer include stirring mixers, blenders, mills (e.g., colloid mills and sand mills), ultrasonicators, atomizers, rotor-stator homogenizers, and high pressure homogenizers.

The term "ultrasonicator" refers to an equipment that can apply ultrasound energy to agitate particles in a sample. Any ultrasonicator that can disperse the slurry disclosed herein can be used herein. Some non-limiting examples of the ultrasonicator include an ultrasonic bath, a probe-type ultrasonicator, and an ultrasonic flow cell.

The term "ultrasonic bath" refers to an apparatus through which the ultrasonic energy is transmitted via the container's wall of the ultrasonic bath into the liquid sample.

The term "probe-type ultrasonicator" refers to an ultrasonic probe immersed into a medium for direct sonication. The term "direct sonication" means that the ultrasound is directly coupled into the processing liquid.

The term "ultrasonic flow cell" or "ultrasonic reactor chamber" refers to an apparatus through which sonication processes can be carried out in a flow-through mode. In some embodiments, the ultrasonic flow cell is in a single-pass, multiple-pass or recirculating configuration.

The term "planetary mixer" refers to an equipment that can be used to mix or blend different materials for producing a homogeneous mixture, which consists of a single or double blade with a high speed dispersion blade. The rotational speed can be expressed in unit of rotations per minute (rpm) which refers to the number of rotations that a rotating body completes in one minute.

The term "applying" as used herein in general refers to an act of laying or spreading a substance on a surface.

The term "current collector" refers to a support for coating the active battery electrode material and a chemically inactive high electron conductor for keeping an electric current flowing to electrodes during discharging or charging a secondary battery.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or the full energy in 10 hours; and a 5 C means utilization of the full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is $1/1,000$ of an ampere-hour.

The term "doctor blading" refers to a process for fabrication of large area films on rigid or flexible substrates. A coating thickness can be controlled by an adjustable gap width between a coating blade and a coating surface, which allows the deposition of variable wet layer thicknesses.

The term "transfer coating" or "roll coating" refers to a process for fabrication of large area films on rigid or flexible substrates. A slurry is applied on the substrate by transferring a coating from the surface of a coating roller with pressure. A coating thickness can be controlled by an adjustable gap width between a metering blade and a surface of the coating roller, which allows the deposition of variable wet layer thicknesses. In a metering roll system, the thickness of the coating is controlled by adjusting the gap between a metering roller and a coating roller.

The term "battery cycle life" refers to the number of complete charge/discharge cycles a battery can perform before its nominal capacity falls below 80% of its initial rated capacity.

The term "major component" of a composition refers to the component that is more than 50%, more than 55%, more than 60%, more than 65%, more than 70%, more than 75%, more than 80%, more than 85%, more than 90%, or more than 95% by weight or volume, based on the total weight or volume of the composition.

The term "minor component" of a composition refers to the component that is less than 50%, less than 45%, less than 40%, less than 35%, less than 30%, less than 25%, less than 20%, less than 15%, less than 10%, or less than 5% by weight or volume, based on the total weight or volume of the composition.

The term "relatively slow rate" as used herein refers to the loss of solvent from the wet solid in the coated film over a relatively long period of time. In some embodiments, the time required for drying the coated film of a designated coating composition at a relatively slow rate is from about 5 minutes to about 20 minutes.

The term "relatively quick drying rate" as used herein refers to the loss of solvent from the wet solid in the coated film over a relatively short period of time. In some embodiments, the time required for drying the coated film of a designated coating composition at a relatively quick drying rate is from about 1 minute to about 5 minutes.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

FIG. 1 shows an embodiment of the method disclosed herein, in which a first suspension is prepared by pre-treating an active battery electrode material in a first aqueous solution having a pH from about 2.0 to about 7.5 to form a first suspension. The first suspension is then dried to obtain a pre-treated active battery electrode material. A slurry is prepared by mixing the pre-treated active battery electrode material, a conductive agent, and a binder material in a second aqueous solution. Further components may be added. The slurry is then homogenized by a homogenizer to obtain a homogenized slurry. A current collector is coated with the homogenized slurry, and the coated collector is then dried to form the battery electrode.

In certain embodiments, the first suspension is prepared by pre-treating an active battery electrode material in a first aqueous solution having a pH from about 2.0 to about 7.5.

Any temperature that can pre-treat the active battery electrode material can be used herein. In some embodiments, the active battery electrode material can be added to the stirring first aqueous solution at about 14° C., about 16° C., about 18° C., about 20° C., about 22° C., about 24° C., or about 26° C. In certain embodiments, the pre-treating process can be performed with heating at a temperature from about 30° C. to about 80° C., from about 35° C. to about 80° C., from about 40° C. to about 80° C., from about 45° C. to about 80° C., from about 50° C. to about 80° C., from about 55° C. to about 80° C., from about 55° C. to about 70° C., from about 45° C. to about 85° C., or from about 45° C. to about 90° C. In some embodiments, the pre-treating process can be performed at a temperature below 30° C., below 25° C., below 22° C., below 20° C., below 15° C., or below 10° C.

In some embodiments, the active battery electrode material is a cathode material, wherein the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.3 to 0.8; each y is independently from 0.1 to 0.45; and each z is independently from 0 to 0.2. In certain embodiments, the cathode material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.4 to 0.6; each y is independently from 0.2 to 0.4; and each z is independently from 0 to 0.1. In other embodiments, the cathode material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode material is not $LiNi_xMn_yO_2$, $Li_{1+z}Ni_xMn_yCo_{1-x-y}O_2$, or $LiNi_xCo_yAl_zO_2$, wherein each x is independently from 0.3 to 0.8; each y is independently from 0.1 to 0.45; and each z is independently from 0 to 0.2.

In certain embodiments, the first aqueous solution is a solution containing water as the major component and a volatile solvent, such as alcohols, lower aliphatic ketones, lower alkyl acetates or the like, as the minor component in addition to water. In certain embodiments, the amount of water is at least 50%, at least 55%, at least 60%, at least 65%, at least 70%, at least 75%, at least 80%, at least 85%, at least 90%, or at least 95% to the total amount of water and solvents other than water. In some embodiments, the amount of water is at most 55%, at most 60%, at most 65%, at most 70%, at most 75%, at most 80%, at most 85%, at most 90%, or at most 95% to the total amount of water and solvents other than water. In some embodiments, the first aqueous solution consists solely of water, that is, the proportion of water in the first aqueous solution is 100 vol. %.

Any water-miscible solvents can be used as the minor component. Some non-limiting examples of the minor component (i.e., solvents other than water) include alcohols, lower aliphatic ketones, lower alkyl acetates and combinations thereof. Some non-limiting examples of the alcohol include $C_1$-$C_4$ alcohols, such as methanol, ethanol, isopropanol, n-propanol, butanol, and combinations thereof. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

In certain embodiments, the volatile solvent or the minor component is methyl ethyl ketone, ethanol, ethyl acetate or a combination thereof.

In some embodiments, the first aqueous solution is a mixture of water and one or more water-miscible minor component. In certain embodiments, the first aqueous solution is a mixture of water and a minor component selected from ethanol, isopropanol, n-propanol, t-butanol, n-butanol, and combinations thereof. In some embodiments, the volume ratio of water and the minor component is from about 51:49 to about 100:1.

In certain embodiments, the first aqueous solution is water. Some non-limiting examples of water include tap water, bottled water, purified water, pure water, distilled water, de-ionized water, $D_2O$, or a combination thereof. In some embodiments, the first aqueous solution is de-ionized water. In certain embodiments, the first aqueous solution is free of alcohol, aliphatic ketone, alkyl acetate, or a combination thereof.

In some embodiments, the first aqueous solution is acidic, slightly alkaline, or neutral, and has a pH anywhere within the range of about 2.0 to about 8.0. In certain embodiments, the pH of the first aqueous solution is from about 2.0 to about 7.5, from about 3.0 to about 7.5, from about 4.0 to about 7.5, from about 4.0 to about 7.0, from about 5.0 to about 7.5, from about 6.0 to about 7.5, from about 6.0 to about 7.0. In some embodiments, the pH of the first aqueous solution is about 7.0, about 6.5, about 6.0, about 5.5, about 5.0, or about 4.0. In other embodiments, the pH of the first aqueous solution is from about 2 to about 7, from about 2 to about 6, from about 2 to about 5, or from about 2 to about 4. In some embodiments, the pH of the first aqueous solution is less than about 7, less than about 6, less than about 5, less than about 4, or less than about 3.

In certain embodiments, the first aqueous solution comprises one or more acids selected from the group consisting of inorganic acids, organic acids, and combinations thereof.

In some embodiments, the acid is a mixture of one or more inorganic acids and one or more organic acids, wherein a weight ratio of the one or more inorganic acids to the one or more organic acids is from about 10/1 to about 1/10, from about 8/1 to about 1/8, from about 6/1 to about 1/6, or from about 4/1 to about 1/4.

In certain embodiments, the one or more inorganic acids are selected from the group consisting of hydrochloric acid, nitric acid, phosphoric acid, sulfuric acid, boric acid, hydrofluoric acid, hydrobromic acid, perchloric acid, hydroiodic acid, and combinations thereof. In further embodiments, the one or more inorganic acids are sulfuric acid, hydrochloric acid, hydrobromic acid, nitric acid, phosphoric acid, and combinations thereof. In still further embodiments, the inorganic acid is hydrochloric acid. In some embodiments, the acid is free of inorganic acid such as hydrochloric acid, nitric acid, phosphoric acid, sulfuric acid, boric acid, hydrofluoric acid, hydrobromic acid, perchloric acid, or hydroiodic acid.

In some embodiments, the one or more organic acids are selected from the group consisting of acetic acid, lactic acid, oxalic acid, citric acid, uric acid, trifluoroacetic acid, methanesulfonic acid, formic acid, propionic acid, butyric acid, valeric acid, gluconic acid, malic acid, caproic acid, and combinations thereof. In further embodiments, the one or more organic acids are formic acid, acetic acid, propionic acid, and combinations thereof. In still further embodiments, the organic acid is acetic acid. In some embodiments, the acid is free of organic acid such as acetic acid, lactic acid, oxalic acid, citric acid, uric acid, trifluoroacetic acid, methanesulfonic acid, formic acid, propionic acid, butyric acid, valeric acid, gluconic acid, malic acid, or caproic acid.

The pH of the first aqueous solution is maintained during the addition of the active battery electrode material at a range from about 4.0 to about 7.5 by addition of one or more acids as a pH adjuster. The choice of the pH adjuster is not critical. Any suitable organic or inorganic acid may be used. In some embodiments, the pH adjuster is an acid selected from the group consisting of an inorganic acid, an organic acid, and combinations thereof. The pH can be monitored by a pH measuring device such as pH sensors. In some embodiments, more than one pH sensors are used for monitoring the pH value.

In some embodiments, after adding the active battery electrode material to the first aqueous solution, the mixture can be further stirred for a time period sufficient for forming the first suspension. In certain embodiments, the time period is from about 5 minutes to about 2 hours, from about 5 minutes to about 1.5 hours, from about 5 minutes to about 1 hour, from about 5 minutes to about 30 minutes, from about 5 minutes to about 15 minutes, from about 10 minutes to about 2 hours, from about 10 minutes to about 1.5 hours, from about 10 minutes to about 1 hour, from about 10 minutes to about 30 minutes, from about 15 minutes to about 1 hour, or from about 30 minutes to about 1 hour.

In certain embodiments, the active battery electrode material is an anode material, wherein the anode material is selected from the group consisting of natural graphite particulate, synthetic graphite particulate, Sn (tin) particulate, $Li_4Ti_5O_{12}$ particulate, Si (silicon) particulate, Si—C composite particulate, and combinations thereof.

In some embodiments, the first suspension can be dried to obtain a pre-treated active battery electrode material. Any dryer that can dry a suspension can be used herein. In some embodiments, the drying process is performed by a double-cone vacuum dryer, a microwave dryer, or a microwave vacuum dryer.

In certain embodiments, the dryer is a microwave dryer or a microwave vacuum dryer. In some embodiments, the microwave dryer or microwave vacuum dryer is operated at a power from about 500 W to about 3 kW, from about 5 kW to about 15 kW, from about 6 kW to about 20 kW, from about 7 kW to about 20 kW, from about 15 kW to about 70 kW, from about 20 kW to about 90 kW, from about 30 kW to about 100 kW, or from about 50 kW to about 100 kW.

In some embodiments, the drying step can be carried out for a time period that is sufficient for drying the first suspension. In certain embodiments, the drying time is from about 3 minutes to about 2 hours, from about 5 minutes to about 2 hours, from about 10 minutes to about 3 hours, from about 10 minutes to about 4 hours, from about 15 minutes to about 4 hours, or from about 20 minutes to about 5 hours.

After formation of the pre-treated active battery electrode material by drying the first suspension, a slurry can be formed by dispersing the pre-treated active battery electrode material, a conductive agent, and a binder material in a second aqueous solution.

In certain embodiments, the amount of the pre-treated active battery electrode material is at least 1%, at least 2%, at least 3%, at least 4%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% by weight or volume, based on the total weight or volume of the slurry. In some embodiments, the amount of the pre-treated active battery electrode material is at most 1%, at most 2%, at most 3%, at most 4%, at most 5%, at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90%, or at most 95% by weight or volume, based on the total weight or volume of the slurry.

In some embodiments, the pre-treated active battery electrode material is the major component of the slurry. In some embodiments, the pre-treated active battery electrode material is present in an amount from about 50% to about 95% by weight or volume, from about 55% to about 95% by weight or volume, from about 60% to about 95% by weight or volume, from about 65% to about 95% by weight or volume, from about 70% to about 95% by weight or volume, from about 75% to about 95% by weight or volume, from about 80% to about 95% by weight or volume, from about 85% to about 95% by weight or volume, from about 55% to about 85% by weight or volume, from about 60% to about 85% by weight or volume, from about 65% to about 85% by weight or volume, from about 70% to about 85% by weight or volume, from about 65% to about 80% by weight or volume, or from about 70% to about 80% by weight or volume, based on the total weight or volume of the slurry.

The conductive agent in the slurry is for enhancing the electrically-conducting property of an electrode. In some embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof. In certain embodiments, the conductive agent is not carbon, carbon black, graphite, expanded graphite, graphene, graphene nanoplatelets, carbon fibres, carbon nano-fibers, graphitized carbon flake, carbon tubes, carbon nanotubes, activated carbon, or mesoporous carbon.

The binder material in the slurry performs a role of binding the active battery electrode material and conductive agent together on the current collector. In some embodiments, the binder material is selected from the group consisting of styrene-butadiene rubber (SBR), carboxymethyl cellulose (CMC), polyvinylidene fluoride (PVDF), acrylonitrile copolymer, polyacrylic acid (PAA), polyacrylonitrile, poly(vinylidene fluoride)-hexafluoropropene (PVDF-HFP), latex, a salt of alginic acid, and combinations thereof. In certain embodiments, the salt of alginic acid comprises a cation selected from Na, Li, K, Ca, $NH_4$, Mg, Al, or a combination thereof.

In some embodiments, the binder material is SBR, CMC, PAA, a salt of alginic acid, or a combination thereof. In certain embodiments, the binder material is acrylonitrile copolymer. In some embodiments, the binder material is polyacrylonitrile. In certain embodiments, the binder material is free of styrene-butadiene rubber (SBR), carboxymethyl cellulose (CMC), polyvinylidene fluoride (PVDF), acrylonitrile copolymer, polyacrylic acid (PAA), polyacrylonitrile, poly(vinylidene fluoride)-hexafluoropropene (PVDF-HFP), latex, or a salt of alginic acid.

In certain embodiments, the amount of each of the conductive agent and binder material is independently at least 1%, at least 2%, at least 3%, at least 4%, at least 5%, at least 10%, at least 15%, at least 20%, at least 25%, at least 30%, at least 35%, at least 40%, at least 45%, or at least 50% by weight or volume, based on based on the total weight or volume of the slurry. In some embodiments, the amount of each of the conductive agent and binder material is independently at most 1%, at most 2%, at most 3%, at most 4%, at most 5%, at most 10%, at most 15%, at most 20%, at most 25%, at most 30%, at most 35%, at most 40%, at most 45%, or at most 50% by weight or volume, based on the total weight or volume of the slurry.

In some embodiments, the conductive agent is pre-treated in an alkaline or basic solution prior to step 3). Pre-treating the conductive agent before the slurry preparation can enhance wettability and dispersing capability of the conductive agent in the slurry, thus allowing homogeneous distribution of the conductive agent within the dried composite electrode. If particulates of the conductive agent are dispersed heterogeneously in the electrode, the battery performance, life, and safety will be affected.

In certain embodiments, the conductive agent can be pre-treated for a time period from about 30 minutes to about 2 hours, from about 30 minutes to about 1.5 hours, from about 30 minutes to about 1 hour, from about 45 minutes to about 2 hours, from about 45 minutes to about 1.5 hours, or from about 45 minutes to about 1 hour. In some embodiments, the alkaline or basic solution comprises a base selected from the group consisting of $H_2O_2$, LiOH, NaOH, KOH, $NH_3.H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, and combinations thereof. In certain embodiments, the basic solution comprises an organic base. In some embodiments, the basic solution is free of organic base. In certain embodiments, the basic solution is free of $H_2O_2$, LiOH, NaOH, KOH, $NH_3.H_2O$, $Be(OH)_2$, $Mg(OH)_2$, $Ca(OH)_2$, $Li_2CO_3$, $Na_2CO_3$, $NaHCO_3$, $K_2CO_3$ or $KHCO_3$.

In some embodiments, the pH of the alkaline or basic solution is greater than 7, greater than 8, greater than 9, greater than 10, greater than 11, greater than 12, or greater than 13. In some embodiments, the pH of the alkaline or basic solution is less than 8, less than 9, less than 10, less than 11, less than 12, or less than 13.

In certain embodiments, the conductive agent is dispersed in a third aqueous solution to form a second suspension prior to step 3).

Compared to an active battery electrode material, a conductive agent has a relatively high specific surface area. Therefore, the conductive agent has a tendency to agglomerate due to its relatively high specific surface area, especially when the particulates of the conductive agent must be dispersed in a highly dense suspension of the active battery electrode material. Dispersing the conductive agent before the slurry preparation can minimize the particles from agglomerating, thus allowing more homogeneous distribution of the conductive agent within the dried composite electrode. This could reduce internal resistance and enhance electrochemical performance of electrode materials.

In some embodiments, the amount of the conductive agent in the second suspension is from about 0.05 wt. % to about 0.5 wt. %, from about 0.1 wt. % to about 1 wt. %, from about 0.25 wt. % to about 2.5 wt. %, from about 0.5 wt. % to about 5 wt. %, from about 2 wt. % to about 5 wt. %, from about 3 wt. % to about 7 wt. %, or from about 5 wt. % to about 10 wt. %, based on the total weight of the mixture of the conductive agent and the third aqueous solution.

In certain embodiments, the binder material is dissolved in a fourth aqueous solution to form a resulting solution or a binder solution prior to step 3).

Dispersing the solid binder material before the slurry preparation can prevent adhesion of the solid binder material to the surface of other materials, thus allowing the binder material to disperse homogeneously into the slurry. If the binder material is dispersed heterogeneously in the electrode, the performance of the battery may deteriorate.

In some embodiments, the amount of the binder material in the binder solution is from about 3 wt. % to about 6 wt. %, from about 5 wt. % to about 10 wt. %, from about 7.5 wt. % to about 15 wt. %, from about 10 wt. % to about 20 wt. %, from about 15 wt. % to about 25 wt. %, from about 20 wt. % to about 40 wt. %, or from about 35 wt. % to about 50 wt. %, based on the total weight of the mixture of the binder material and the fourth aqueous solution.

In certain embodiments, each of the second, third and fourth aqueous solutions independently is a solution containing water as the major component and a volatile solvent, such as alcohols, lower aliphatic ketones, lower alkyl acetates or the like, as the minor component in addition to water. In certain embodiments, the amount of water in each solution is independently at least 55%, at least 60%, at least 65%, at least 70%, at least 75%, at least 80%, at least 85%, at least 90%, or at least 95% to the total amount of water and solvents other than water. In some embodiments, the amount of water is at most 55%, at most 60%, at most 65%, at most 70%, at most 75%, at most 80%, at most 85%, at most 90%, or at most 95% to the total amount of water and solvents other than water. In some embodiments, each of the second, third and fourth aqueous solutions independently consists solely of water, that is, the proportion of water in each solution is 100 vol. %.

Any water-miscible solvents can be used as the minor component of the second, third or fourth aqueous solution. Some non-limiting examples of the minor component include alcohols, lower aliphatic ketones, lower alkyl acetates and combinations thereof. Some non-limiting examples of the alcohol include $C_1$-$C_4$ alcohols, such as methanol, ethanol, isopropanol, n-propanol, butanol, and combinations thereof. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

In some embodiments, the volatile solvent or minor component is methyl ethyl ketone, ethanol, ethyl acetate or a combination thereof.

In some embodiments, the composition of the slurry does not require organic solvents. In certain embodiments, each of the second, third and fourth aqueous solutions independently is water. Some non-limiting examples of water include tap water, bottled water, purified water, pure water, distilled water, de-ionized water, $D_2O$, or a combination thereof. In some embodiments, each of the second, third and fourth aqueous solutions independently is purified water, pure water, de-ionized water, distilled water, or a combination thereof. In certain embodiments, each of the second, third and fourth aqueous solutions is free of an organic solvent such as alcohols, lower aliphatic ketones, lower alkyl acetates. Since the composition of the slurry does not contain any organic solvent, expensive, restrictive and complicated handling of organic solvents is avoided during the manufacture of the slurry.

Any temperature that can be used to in the dispersing step to form the slurry can be used herein. In some embodiments, the pre-treated active battery electrode material, conductive agent and binder material are added to the stirring second aqueous solution at about 14° C., about 16° C., about 18° C., about 20° C., about 22° C., about 24° C., or about 26° C. In certain embodiments, the dispersing process can be performed with heating at a temperature from about 30° C. to about 80° C., from about 35° C. to about 80° C., from about 40° C. to about 80° C., from about 45° C. to about 80° C., from about 50° C. to about 80° C., from about 55° C. to about 80° C., from about 55° C. to about 70° C., from about 45° C. to about 85° C., or from about 45° C. to about 90° C. In some embodiments, the dispersing process can be performed at a temperature below 30° C., below 25° C., below 22° C., below 20° C., below 15° C., or below 10° C.

Optional components may be used to assist in dispersing the pre-treated active battery electrode material, conductive agent and binder material in the slurry. In some embodiments, the optional component is a dispersing agent. Any dispersing agent that can enhance the dispersion may be added to the slurry disclosed herein. In certain embodiments, the dispersing agent is selected from the group consisting of ethanol, isopropanol, n-propanol, t-butanol, n-butanol, lithium dodecyl sulfate, trimethylhexadecyl ammonium chloride, polyethylene ethoxylate, sodium dodecylbenzene sulfonate, sodium stearate, and combinations thereof.

In some embodiments, the total amount of the dispersing agent is from about 0.1% to about 10%, from about 0.1% to about 8%, from about 0.1% to about 6%, from about 0.1% to about 5%, from about 0.1% to about 4%, from about 0.1% to about 3%, from about 0.1% to about 2%, or from about 0.1% to about 1% by weight, based on the total weight of the slurry.

In some embodiments, each of the second, third and fourth aqueous solutions independently comprises a dispersing agent for promoting the separation of particles and/or preventing agglomeration of the particles. Any surfactant that can lower the surface tension between a liquid and a solid can be used as the dispersing agent.

In certain embodiments, the dispersing agent is a nonionic surfactant, an anionic surfactant, a cationic surfactant, an amphoteric surfactant, or a combination thereof.

Some non-limiting examples of suitable nonionic surfactant include an alkoxylated alcohol, a carboxylic ester, a polyethylene glycol ester, and combinations thereof. Some non-limiting examples of suitable alkoxylated alcohol include ethoxylated and propoxylated alcohols. In some embodiments, the slurry disclosed herein is free of nonionic surfactant.

Some non-limiting examples of suitable anionic surfactant include a salt of an alkyl sulfate, an alkyl polyethoxylate ether sulfate, an alkyl benzene sulfonate, an alkyl ether sulfate, a sulfonate, a sulfosuccinate, a sarcosinate, and combinations thereof. In some embodiments, the anionic surfactant comprises a cation selected from the group consisting of sodium, potassium, ammonium, and combinations thereof. In some embodiments, the slurry disclosed herein is free of anionic surfactant.

Some non-limiting examples of suitable cationic surfactant include an ammonium salt, a phosphonium salt, an imidazolium salt, a sulfonium salt, and combinations thereof. Some non-limiting examples of suitable ammonium salt include stearyl trimethylammonium bromide (STAB), cetyl trimethylammonium bromide (CTAB), and myristyl trimethylammonium bromide (MTAB), and combinations thereof. In some embodiments, the slurry disclosed herein is free of cationic surfactant.

Some non-limiting examples of suitable amphoteric surfactant are surfactants that contain both cationic and anionic groups. The cationic group is ammonium, phosphonium, imidazolium, sulfonium, or a combination thereof. The anionic hydrophilic group is carboxylate, sulfonate, sulfate, phosphonate, or a combination thereof. In some embodiments, the slurry disclosed herein is free of amphoteric surfactant.

The slurry can be homogenized by a homogenizer. Any equipment that can homogenize the slurry can be used. In some embodiments, the homogenizer is a stirring mixer, a blender, a mill, an ultrasonicator, a rotor-stator homogenizer, an atomizer, or a high pressure homogenizer.

In some embodiments, the homogenizer is an ultrasonicator. Any ultrasonicator that can apply ultrasound energy to agitate and disperse particles in a sample can be used herein. In some embodiments, the ultrasonicator is a probe-type ultrasonicator or an ultrasonic flow cell.

In certain embodiments, the ultrasonic flow cell can be operated in a one-pass, multiple-pass or recirculating mode. In some embodiments, the ultrasonic flow cell can include a water-cooling jacket to help maintain the required temperature. Alternatively, a separate heat exchanger may be used. In certain embodiments, the flow cell can be made from stainless steel or glass.

In some embodiments, the slurry is homogenized for a time period from about 1 hour to about 10 hours, from about 2 hours to about 4 hours, from about 15 minutes to about 4 hours, from about 30 minutes to about 4 hours, from about 1 hour to about 4 hours, from about 2 hours to about 5 hours, from about 3 hours to about 5 hours, or from about 2 hours to about 6 hours.

In certain embodiments, the ultrasonicator is operated at a power density from about 10 W/L to about 100 W/L, from about 20 W/L to about 100 W/L, from about 30 W/L to about 100 W/L, from about 40 W/L to about 80 W/L, from about 40 W/L to about 70 W/L, from about 40 W/L to about 50 W/L, from about 40 W/L to about 60 W/L, from about 50 W/L to about 60 W/L, from about 20 W/L to about 80 W/L, from about 20 W/L to about 60 W/L, or from about 20 W/L to about 40 W/L.

The continuous flow through system has several advantages over the batch-type processing. By sonication via ultrasonic flow cell, the processing capacity becomes significantly higher. The retention time of the material in the flow cell can be adjusted by adjusting the flow rate.

By sonication via recirculating mode, the material is recirculated many times through the flow cell in a recirculating configuration. Recirculation increases the cumulative exposure time because liquid passes through the ultrasonic flow cell only once in a single-pass configuration.

The multiple-pass mode has a multiple flow cell configuration. This arrangement allows for a single-pass processing without the need for recirculation or multiple passes through the system. This arrangement provides an additional productivity scale-up factor equal to the number of utilized flow cells.

The homogenizing step disclosed herein reduces or eliminates the potential aggregation of the active battery electrode material and the conductive agent and enhances dispersion of each ingredient in the slurry.

The homogenized slurry can be applied on a current collector to form a coated film on the current collector. The current collector acts to collect electrons generated by electrochemical reactions of the active battery electrode material or to supply electrons required for the electrochemical reactions. In some embodiments, each of the current collectors of the positive and negative electrodes, which can be in the form of a foil, sheet or film, is independently stainless steel, titanium, nickel, aluminum, copper or electrically-conductive resin. In certain embodiments, the current collector of the positive electrode is an aluminum thin film. In some embodiments, the current collector of the negative electrode is a copper thin film.

In some embodiments, the current collector has a thickness from about 6 μm to about 100 μm since thickness will affect the volume occupied by the current collector within a battery and the amount of the active battery electrode material and hence the capacity in the battery.

In certain embodiments, the coating process is performed using a doctor blade coater, a slot-die coater, a transfer coater, a spray coater, a roll coater, a gravure coater, a dip coater, or a curtain coater. In some embodiments, the thickness of the coated film on the current collector is from about 10 μm to about 300 μm, or from about 20 μm to about 100 μm.

After applying the homogenized slurry on a current collector, the coated film on the current collector can be dried by a dryer to obtain the battery electrode. Any dryer that can dry the coated film on the current collector can be used herein. Some non-limiting examples of the dryer are a batch drying oven, a conveyor drying oven, and a microwave drying oven. Some non-limiting examples of the conveyor drying oven include a conveyor hot air drying oven, a conveyor resistance drying oven, a conveyor inductive drying oven, and a conveyor microwave drying oven.

In some embodiments, the conveyor drying oven for drying the coated film on the current collector includes one or more heating sections, wherein each of the heating sections is individually temperature controlled, and wherein each of the heating sections may include independently controlled heating zones.

In certain embodiments, the conveyor drying oven comprises a first heating section positioned on one side of the conveyor and a second heating section positioned on an opposing side of the conveyor from the first heating section, wherein each of the first and second heating sections independently comprises one or more heating elements and a temperature control system connected to the heating elements of the first heating section and the second heating section in a manner to monitor and selectively control the temperature of each heating section.

In some embodiments, the conveyor drying oven comprises a plurality of heating sections, wherein each heating section includes independent heating elements that are operated to maintain a constant temperature within the heating section.

In certain embodiments, each of the first and second heating sections independently has an inlet heating zone and an outlet heating zone, wherein each of the inlet and outlet heating zones independently comprises one or more heating elements and a temperature control system connected to the heating elements of the inlet heating zone and the outlet heating zone in a manner to monitor and selectively control the temperature of each heating zone separately from the temperature control of the other heating zones.

In some embodiments, the coated film on the current collector can be dried at a temperature from about 50° C. to about 80° C. The temperature range means a controllable temperature gradient in which the temperature gradually rises from the inlet temperature of 50° C. to the outlet temperature of 80° C. The controllable temperature gradient avoids the coated film on the current collector from drying too rapidly. Drying the coated film too quickly can degrade materials in the slurry. Drying the coated film too quickly can also cause stress defects in the electrode because the solvent can be removed from the coated film more quickly than the film can relax or adjust to the resulting volume changes, which can cause defects such as cracks. It is believed that avoiding such defects can generally enhance performance of the electrode. Furthermore, drying the coated film too quickly can cause the binder material to migrate and form a layer of the binder material on the surface of the electrode.

In certain embodiments, the coated film on the current collector is dried at a relatively slow rate. In certain embodiments, the coated film on the current collector is dried relatively slowly at a constant rate, followed by a relatively quick drying rate.

In some embodiments, the coated film on the current collector can be dried at a temperature from about 45° C. to about 100° C., from about 50° C. to about 100° C., from about 55° C. to about 100° C., from about 50° C. to about 90° C., from about 55° C. to about 80° C., from about 55° C. to about 75° C., from about 55° C. to about 70° C., from about 50° C. to about 80° C., or from about 50° C. to about 70° C.

In certain embodiments, the conveyor moves at a speed from about 2 meter/minute to about 30 meter/minute, from about 2 meter/minute to about 25 meter/minute, from about 2 meter/minute to about 20 meter/minute, from about 2 meter/minute to about 16 meter/minute, from about 3 meter/minute to about 30 meter/minute, from about 3 meter/minute to about 20 meter/minute, or from about 3 meter/minute to about 16 meter/minute.

Controlling the conveyor length and speed can regulate the drying time of the coated film. Therefore, the drying time can be increased without increasing the length of the conveyor. In some embodiments, the coated film on the current collector can be dried for a time period from about 1 minute to about 30 minutes, from about 1 minute to about 25 minutes, from about 1 minute to about 20 minutes, from about 1 minute to about 15 minutes, from about 1 minute to about 10 minutes, from about 2 minutes to about 15 minutes, or from about 2 minutes to about 10 minutes.

After the coated film on the current collector is dried, the battery electrode is formed. In some embodiments, the battery electrode is compressed mechanically in order to enhance the density of the electrode.

The method disclosed herein has the advantage that an aqueous solvent is used in the manufacturing process, which can save process time and facilities by avoiding the need to handle or recycle hazardous organic solvents. In addition, costs are reduced by simplifying the total process. Therefore, this method is especially suited for industrial processes because of its low cost and ease of handling.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Example 1

A) Pre-Treatment of Active Battery Electrode Material

A particulate cathode material $LiNi_{0.33}Mn_{0.33}Co_{0.33}O_2$ (obtained from Xiamen Tungsten CO. Ltd., China) was added to a stirring solution containing 50% deionized water and 50% ethanol at room temperature to form a suspension having a solid content of about 35% by weight. The pH of the suspension was measured using a pH meter and the pH was about 7. The suspension was further stirred at room temperature for 5 hours. Then the suspension was separated and dried by a 2.45 GHz microwave dryer (ZY-4HO, obtained from Zhiya Industrial Microwave Equipment Co., Ltd., Guangdong, China) at 750 W for 5 minutes to obtain a pre-treated active battery electrode material.

B) Preparation of Positive Electrode Slurry

A positive electrode slurry was prepared by mixing 91 wt. % pre-treated active battery electrode material, 4 wt. % carbon black (SuperP; Timcal Ltd, Bodio, Switzerland), 4 wt. % polyacrylonitrile (LA 132, Chengdu Indigo Power Sources Co., Ltd., China) and 1% isopropanol (obtained from Aladdin Industries Corporation, China) in deionized water to form a slurry having a solid content of 70 wt. %. The slurry was homogenized by a planetary stirring mixer (200 L mixer, Chienemei Industry Co. Ltd., China) for 6 hours operated at a stirring speed of 20 rpm and a dispersing speed of 1500 rpm to obtain a homogenized slurry.

C) Preparation of Positive Electrode

The homogenized slurry was coated onto both sides of an aluminum foil having a thickness of 20 μm using a transfer coater (ZY-TSF6-6518, obtained from Jin Fan Zhanyu New Energy Technology Co. Ltd., China) with an area density of about 26 mg/cm². The coated films on the aluminum foil were dried for 3 minutes by a 24-meter-long conveyor hot air drying oven as a sub-module of the transfer coater operated at a conveyor speed of about 8 meter/minute to obtain a positive electrode. The temperature-programmed oven allowed a controllable temperature gradient in which the temperature gradually rose from the inlet temperature of 55° C. to the outlet temperature of 80° C.

D) Preparation of Negative Electrode

A negative electrode slurry was prepared by mixing 90 wt. % hard carbon (HC; 99.5% purity, Ruifute Technology Ltd., Shenzhen, Guangdong, China), 5 wt. % carbon black and 5 wt. % polyacrylonitrile in deionized water to form a slurry having a solid content of 50 wt. %. The slurry was coated onto both sides of a copper foil having a thickness of 9 μm using a transfer coater with an area density of about 15 mg/cm². The coated films on the copper foil were dried at about 50° C. for 2.4 minute by a 24-meter-long conveyor hot air dryer operated at a conveyor speed of about 10 meter/minute to obtain a negative electrode.

Morphological Measurement of Example 1

Figure 2:
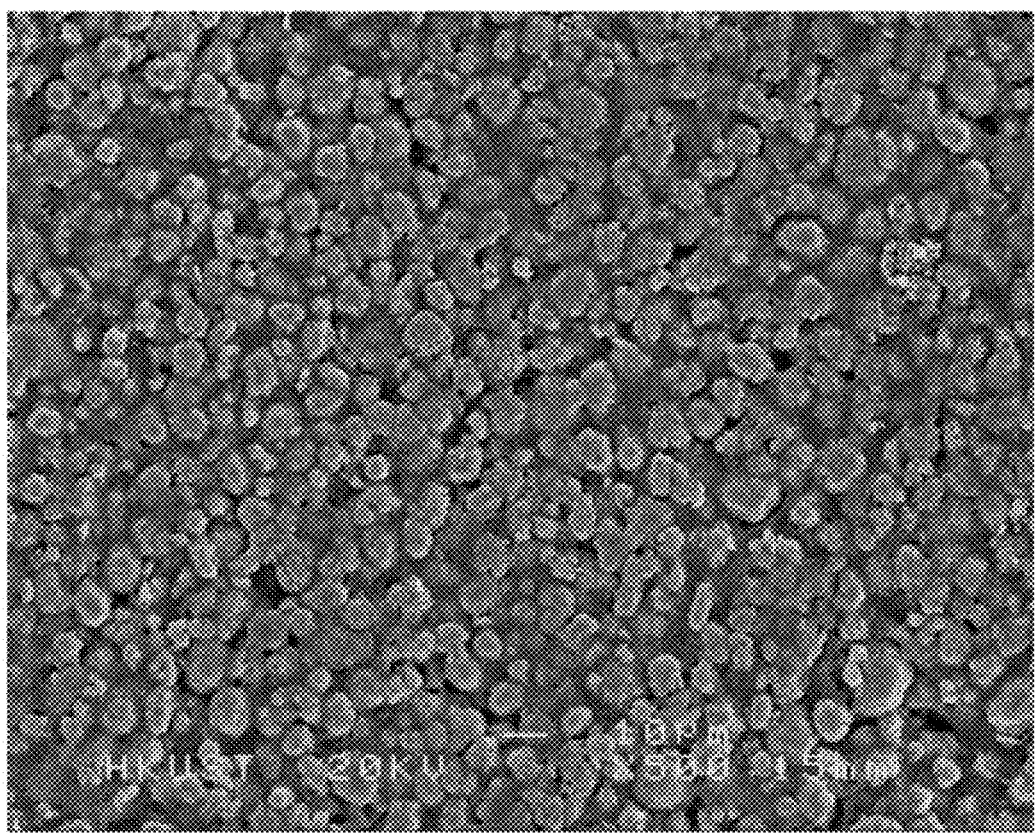
FIG. 2 depicts a SEM image of the surface morphology of Example 1, an embodiment of the coated cathode electrode disclosed herein.

FIG. 2 shows the SEM image of the surface morphology of the coated cathode electrode after drying. The morphology of the coated cathode electrode was characterized by a scanning electron microscope (JEOL-6300, obtained from JEOL, Ltd., Japan). The SEM image clearly shows a uniform, crack-free and stable coating throughout the electrode surface. Furthermore, the electrode shows a homogeneous distribution of the pre-treated active battery electrode material and conductive agent without large agglomerates.

Example 2

Assembling of Pouch-Type Battery

After drying, the resulting cathode film and anode film of Example 1 were used to prepare the cathode and anode respectively by cutting into individual electrode plates. A pouch cell was assembled by stacking the cathode and anode electrode plates alternatively and then packaged in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 2

I) Nominal Capacity

The cell was tested galvanostatically at a current density of C/2 at 25° C. on a battery tester (BTS-5V20A, obtained from Neware Electronics Co. Ltd, China) between 3.0 V and 4.3 V. The nominal capacity was about 10 Ah.

II) Cyclability Performance

Figure 3:
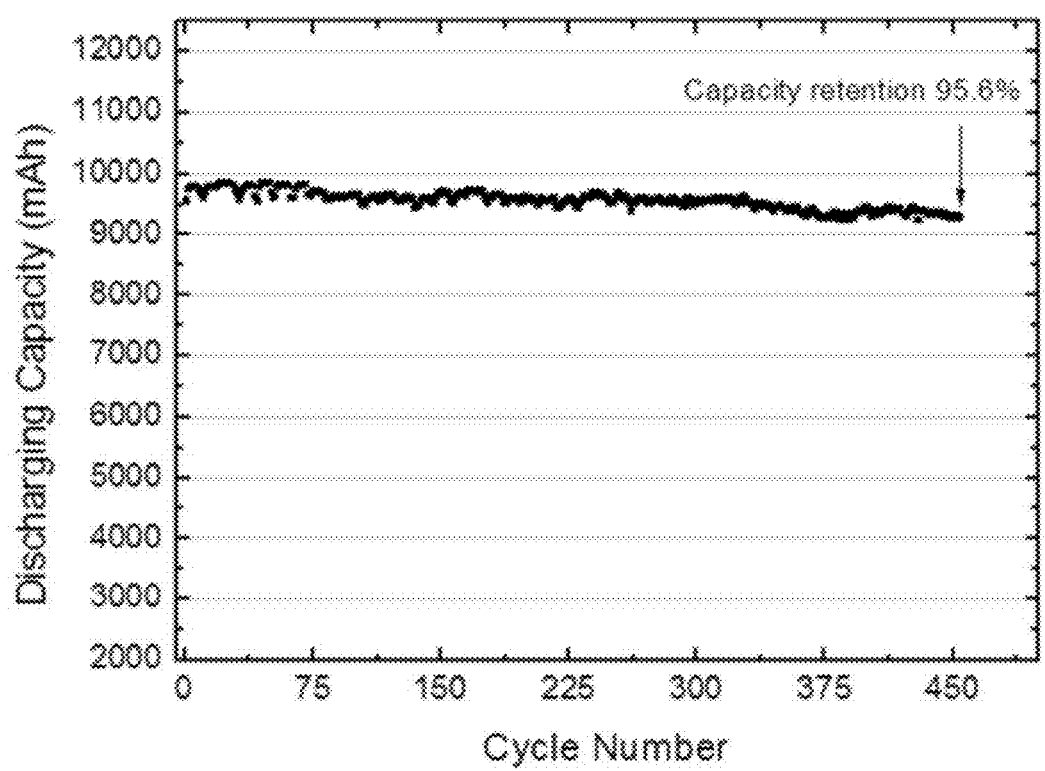
FIG. 3 depicts cycling performance of an electrochemical cell containing a cathode and an anode prepared by the method described in Example 2.

The cyclability performance of the pouch cell was tested by charging and discharging at a constant current rate of 1 C between 3.0 V and 4.3 V. Test result of cyclability performance is shown in FIG. 3. The capacity retention after 450 cycles was about 95.6% of the initial value. This excellent cyclability indicates that battery cell made of cathode and anode electrodes prepared by the method disclosed herein can achieve comparable or even better stability compared to battery cell made of cathode and anode electrodes prepared by conventional method involving the use of organic solvents.

Example 3

A) Pre-Treatment of Active Battery Electrode Material

A particulate cathode material $LiMn_2O_4$ (obtained from HuaGuan HengYuan LiTech Co. Ltd., Qingdao, China) was added to a stirring 7 wt. % solution of acetic acid in water (obtained from Aladdin Industries Corporation, China) at room temperature to form a suspension having a solid content of about 50% by weight. The pH of the suspension was measured using a pH meter and the pH was about 6. The suspension was further stirred at room temperature for 2.5 hours. Then the suspension was separated and dried by a 2.45 GHz microwave dryer at 750 W for 5 minutes to obtain a pre-treated active battery electrode material.

B) Preparation of Positive Electrode Slurry

Carbon nanotube (NTP2003; Shenzhen Nanotech Port Co., Ltd., China) (25 g) was pretreated in 2 L of an alkaline solution containing 0.5 wt. % NaOH for about 15 minutes and then washed by deionized water (5 L). The treated carbon nanotube was then dispersed in deionized water to form a suspension having a solid content of 6.25 wt. %.

A positive electrode slurry was prepared by mixing 92 wt. % pre-treated active battery electrode material, 3 wt. % carbon black, 1 wt. % suspension of the treated carbon nanotube and 4 wt. % polyacrylonitrile in deionized water to form a slurry having a solid content of 65 wt. %. The slurry was homogenized by a circulating ultrasonic flow cell (NP8000, obtained from Guangzhou Newpower Ultrasonic Electronic Equipment Co., Ltd., China) for 8 hours operated at 1000 W to obtain a homogenized slurry.

C) Preparation of Positive Electrode

The homogenized slurry was coated onto both sides of an aluminum foil having a thickness of 20 μm using a transfer coater with an area density of about 40 mg/cm². The coated films on the aluminum foil were dried for 6 minutes by a 24-meter-long conveyor hot air drying oven as a sub-module of the transfer coater operated at a conveyor speed of about 4 meter/minute to obtain a positive electrode. The temperature-programmed oven allowed a controllable temperature gradient in which the temperature gradually rose from the inlet temperature of 65° C. to the outlet temperature of 90° C.

D) Preparation of Negative Electrode

A negative electrode slurry was prepared by mixing 90 wt. % hard carbon (HC; 99.5% purity, Ruifute Technology Ltd., Shenzhen, Guangdong, China), 5 wt. % carbon black and 5 wt. % polyacrylonitrile in deionized water to form a slurry having a solid content of 50 wt. %. The slurry was coated onto both sides of a copper foil having a thickness of 9 μm using a transfer coater with an area density of about 15 mg/cm². The coated films on the copper foil were dried at about 50° C. for 2.4 minutes by a 24-meter-long conveyor hot air dryer operated at a conveyor speed of about 10 meter/minute to obtain a negative electrode.

Example 4

Assembling of Pouch-Type Battery

After drying, the resulting cathode film and anode film of Example 3 were used to prepare the cathode and anode respectively by cutting into individual electrode plates. A pouch cell was assembled by stacking the cathode and anode electrode plates alternatively and then packaged in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 4

I) Nominal Capacity

The cell was tested galvanostatically at a current density of C/2 at 25° C. on a battery tester between 3.0 V and 4.3 V. The nominal capacity was about 10 Ah.

II) Cyclability Performance

Figure 4:
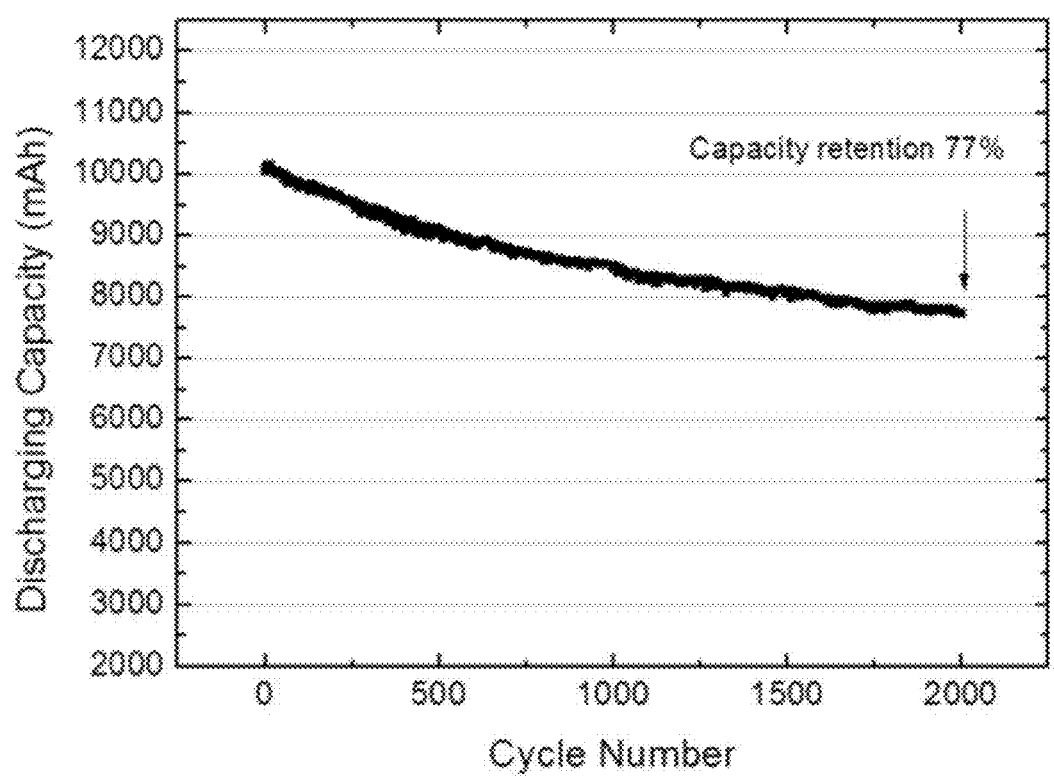
FIG. 4 depicts cycling performance of an electrochemical cell containing a cathode and an anode prepared by the method described in Example 4.

The cyclability performance of the pouch cell was tested by charging and discharging at a constant current rate of 1 C between 3.0 V and 4.3 V. Test result of cyclability performance is shown in FIG. 4. The capacity retention after 2000 cycles was about 77% of the initial value. This excellent cyclability indicates that battery cell made of cathode and anode electrodes prepared by the method disclosed herein can achieve comparable or even better stability compared to battery cell made of cathode and anode electrodes prepared by conventional method involving the use of organic solvents.

Example 5

A) Pre-Treatment of Active Battery Electrode Material

A particulate cathode material $LiNi_{0.33}Mn_{0.33}Co_{0.33}O_2$ (obtained from Shenzhen Tianjiao Technology Co. Ltd., China) was added to a stirring deionized water at room temperature to form a suspension having a solid content of about 65% by weight. The pH of the suspension was measured using a pH meter and the pH was about 7. The suspension was further stirred at room temperature for 10 hours. Then the suspension was separated and dried by a 2.45 GHz microwave dryer at 750 W for 5 minutes to obtain a pre-treated active battery electrode material.

B) Preparation of Positive Electrode Slurry

A positive electrode slurry was prepared by mixing 93 wt. % pre-treated active battery electrode material, 3 wt. % carbon black, 0.5 wt. % nonylphenol ethoxylate (TERGITOL™ NP-6, DOW Chemical, US) and 3.5 wt. % polyacrylonitrile in deionized water to form a slurry having a solid content of 75 wt. %. The slurry was homogenized by a circulating ultrasonic flow cell for 8 hours operated at 1000 W to obtain a homogenized slurry.

C) Preparation of Positive Electrode

The homogenized slurry was coated onto both sides of an aluminum foil having a thickness of 20 μm using a transfer coater with an area density of about 32 mg/cm². The coated films on the aluminum foil were dried for 4 minutes by a 24-meter-long conveyor hot air drying oven as a sub-module of the transfer coater operated at a conveyor speed of about 6 meter/minute to obtain a positive electrode. The temperature-programmed oven allowed a controllable temperature gradient in which the temperature gradually rose from the inlet temperature of 50° C. to the outlet temperature of 75° C.

D) Preparation of Negative Electrode

A negative electrode slurry was prepared by mixing 90 wt. % hard carbon, 5 wt. % carbon black and 5 wt. % polyacrylonitrile in deionized water to form a slurry having a solid content of 50 wt. %. The slurry was coated onto both sides of a copper foil having a thickness of 9 μm using a transfer coater with an area density of about 15 mg/cm². The coated films on the copper foil were dried at about 50° C. for 2.4 minutes by a 24-meter-long conveyor hot air dryer operated at a conveyor speed of about 10 meter/minute to obtain a negative electrode.

Example 6

Assembling of Pouch-Type Battery

After drying, the resulting cathode film and anode film of Example 5 were used to prepare the cathode and anode respectively by cutting into individual electrode plates. A pouch cell was assembled by stacking the cathode and anode electrode plates alternatively and then packaged in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 6

I) Nominal Capacity

The cell was tested galvanostatically at a current density of C/2 at 25° C. on a battery tester between 3.0 V and 4.3 V. The nominal capacity was about 10 Ah.

II) Cyclability Performance

Figure 5:
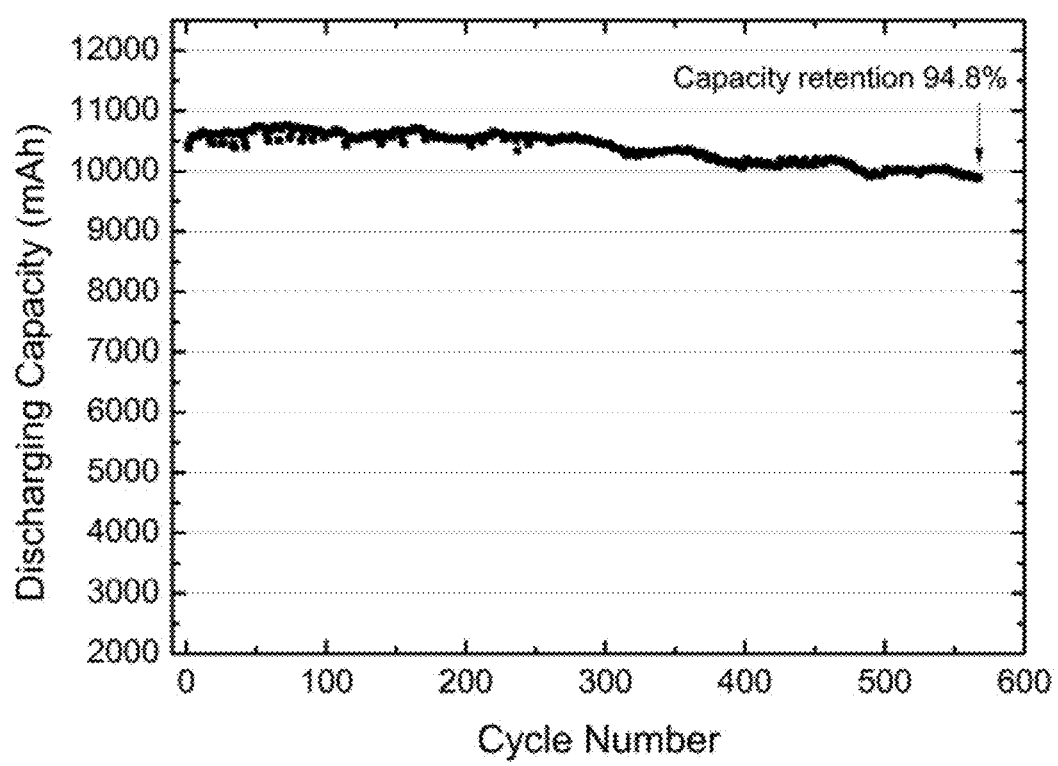
FIG. 5 depicts cycling performance of an electrochemical cell containing a cathode and an anode prepared by the method described in Example 6.

The cyclability performance of the pouch cell was tested by charging and discharging at a constant current rate of 1 C between 3.0 V and 4.3 V. Test result of cyclability performance is shown in FIG. 5. The capacity retention after 560 cycles was about 94.8% of the initial value. This excellent cyclability indicates that battery cell made of cathode and anode electrodes prepared by the method disclosed herein can achieve comparable or even better stability compared to battery cell made of cathode and anode electrodes prepared by conventional method involving the use of organic solvents.

Example 7

A) Pre-Treatment of Active Battery Electrode Material

A particulate cathode material $LiFePO_4$ (obtained from Xiamen Tungsten Co. Ltd., China) was added to a stirring 3 wt. % solution of acetic acid in water (obtained from Aladdin Industries Corporation, China) at room temperature to form a suspension having a solid content of about 50% by weight. The pH of the suspension was measured using a pH meter and the pH was about 3.8. The suspension was further stirred at room temperature for 2.5 hours. Then the suspension was separated and dried by a 2.45 GHz microwave dryer at 700 W for 5 minutes to obtain a pre-treated active battery electrode material.

B) Preparation of Positive Electrode Slurry

A positive electrode slurry was prepared by mixing 88 wt. % pre-treated active battery electrode material, 5.5 wt. % carbon black, 0.5 wt. % nonylphenol ethoxylate (TERGITOL™ NP-6, DOW Chemical, US) and 6 wt. % polyacrylonitrile in deionized water to form a slurry having a solid content of 70 wt. %. The slurry was homogenized by a circulating ultrasonic flow cell for 6 hours operated at 1000 W to obtain a homogenized slurry.

C) Preparation of Positive Electrode

The homogenized slurry was coated onto both sides of an aluminum foil having a thickness of 30 μm using a transfer coater with an area density of about 56 mg/cm$^2$. The coated films on the aluminum foil were then dried for 6 minutes by a 24-meter-long conveyor hot air drying oven as a sub-module of the transfer coater operated at a conveyor speed of about 4 meter/minute to obtain a positive electrode. The temperature-programmed oven allowed a controllable temperature gradient in which the temperature gradually rose from the inlet temperature of 75° C. to the outlet temperature of 90° C.

D) Preparation of Negative Electrode

A negative electrode slurry was prepared by mixing 90 wt. % hard carbon (HC; 99.5% purity, Ruifute Technology Ltd., Shenzhen, Guangdong, China), 5 wt. % carbon black and 5 wt. % polyacrylonitrile in deionized water to form a slurry having a solid content of 50 wt. %. The slurry was coated onto both sides of a copper foil having a thickness of 9 μm using a transfer coater with an area density of about 15 mg/cm$^2$. The coated films on the copper foil were then dried at about 50° C. for 2.4 minutes by a 24-meter-long conveyor hot air dryer operated at a conveyor speed of about 10 meter/minute to obtain a negative electrode.

Example 8

Assembling of Pouch-Type Battery

After drying, the resulting cathode film and anode film of Example 7 were used to prepare the cathode and anode respectively by cutting into individual electrode plates. A pouch cell was assembled by stacking the cathode and anode electrode plates alternatively and then packaged in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 8

I) Nominal Capacity

The cell was tested galvanostatically at a current density of C/2 at 25° C. on a battery tester between 2.5 V and 3.6 V. The nominal capacity was about 3.6 Ah.

II) Cyclability Performance

Figure 6:
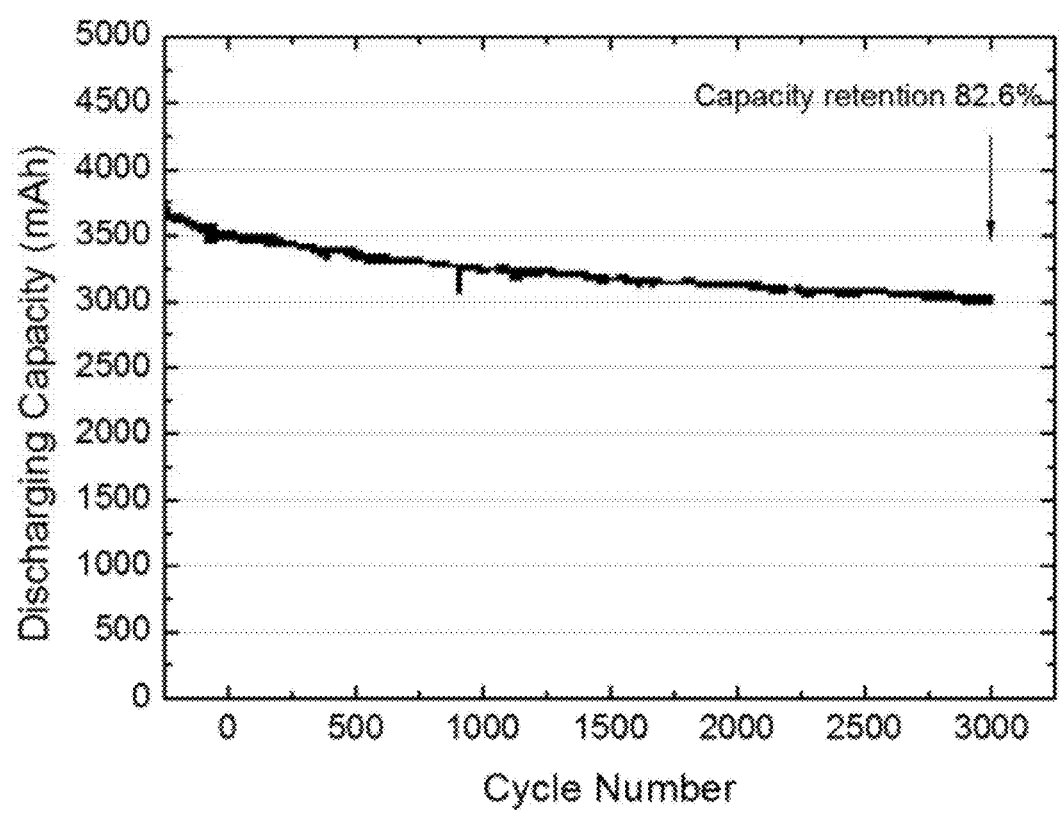
FIG. 6 depicts cycling performance of an electrochemical cell containing a cathode and an anode prepared by the method described in Example 8.

The cyclability performance of the pouch cell was tested by charging and discharging at a constant current rate of 1 C between 2.5 V and 3.6 V. Test result of cyclability performance is shown in FIG. 6. The capacity retention after 3000 cycles was about 82.6% of the initial value. This excellent cyclability indicates that battery cell made of cathode and anode electrodes prepared by the method disclosed herein can achieve comparable or even better stability compared to battery cell made of cathode and anode electrodes prepared by conventional method involving the use of organic solvents.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method of preparing a battery cathode electrode, comprising the steps of:
1) pre-treating a cathode material in a first aqueous solution comprising water and having a pH from about 5.0 to about 7.5 to form a first suspension;
2) drying the first suspension to obtain a pre-treated cathode material;
3) dispersing the pre-treated cathode material, a conductive agent, and a binder material in a second aqueous solution to form a slurry;
4) homogenizing the slurry by a homogenizer to obtain a homogenized slurry;
5) applying the homogenized slurry on a current collector to form a coated film on the current collector; and
6) drying the coated film on the current collector to form the battery cathode electrode at a temperature from about 45° C. to about 90° C. for a time period from about 1 minute to about 20 minutes;

wherein the amount of water in the first aqueous solution is at least 50% and wherein the amount of water in the second aqueous solution is at least 90%;

wherein the cathode material is selected from the group consisting of $LiCoO_2$, $LiNi_xMn_yO_2$, $Li_{1+z}Ni_xMn_yCo_{1-x-y}O_2$, $LiNi_xCo_yAl_zO_2$, $LiMnO_2$, $LiMn_2O_4$, $LiFePO_4$ and combinations thereof, wherein each x is independently from 0.3 to 0.8; each y is independently from 0.1 to 0.45; and each z is independently from 0 to 0.2;

wherein the conductive agent is selected from the group consisting of carbon, carbon black, graphite, expanded graphite, graphene, graphene nanoplatelets, carbon fibers, carbon nano-fibers, graphitized carbon flake, carbon tubes, carbon nanotubes, activated carbon, mesoporous carbon, and combinations thereof; and wherein the binder material is selected from the group consisting of, acrylonitrile copolymer, polyacrylic acid, polyacrylonitrile, a salt of alginic acid, and combinations thereof.

2. The method of claim 1, wherein the first aqueous solution comprises one or more acids selected from the group consisting of $H_2SO_4$, $HNO_3$, HCOOH, $CH_3COOH$, $H_3C_6H_5O_7$, $H_2C_2O_4$, $C_6H_{12}O_7$, $C_4H_6O_5$, and combinations thereof.

3. The method of claim 1, wherein the first aqueous solution further comprises ethanol, isopropanol, methanol, acetone, n-propanol, t-butanol, or a combination thereof.

4. The method of claim 1, wherein the first suspension is dried by a double-cone vacuum dryer, a microwave dryer, or a microwave vacuum dryer.

5. The method of claim 1, wherein the conductive agent is pre-treated in a basic solution for a time period from about 30 minutes to about 2 hours and wherein the basic solution comprises a base selected from the group consisting of $H_2O_2$, LiOH, NaOH, KOH, $NH_3 \cdot H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, and combinations thereof.

6. The method of claim 1, wherein the conductive agent is dispersed in a third aqueous solution to form a second suspension prior to step 3).

7. The method of claim 1, wherein the salt of alginic acid comprises a cation selected from Na, Li, K, Ca, $NH_4$, Mg, Al, and a combination thereof.

8. The method of claim 1, wherein the binder material is dissolved in a fourth aqueous solution to form a resulting solution prior to step 3).

9. The method of claim 1, wherein the slurry further comprises a dispersing agent selected from the group consisting of ethanol, isopropanol, n-propanol, t-butanol, n-butanol, lithium dodecyl sulfate, trimethylhexadecyl ammonium chloride, alcohol ethoxylate, nonylphenol ethoxylate, sodium dodecylbenzene sulfonate, sodium stearate, and combinations thereof.

10. The method of claim 1, wherein the homogenizer is a stirring mixer, a blender, a mill, an ultrasonicator, a rotor-stator homogenizer, or a high pressure homogenizer.

11. The method of claim 10, wherein the ultrasonicator is a probe-type ultrasonicator or an ultrasonic flow cell.

12. The method of claim 1, wherein the homogenized slurry is applied on the current collector using a doctor blade coater, a slot-die coater, a transfer coater, or a spray coater.

13. The method of claim 1, wherein the coated film is dried by a conveyor hot air drying oven, a conveyor resistance drying oven, a conveyor inductive drying oven, or a conveyor microwave drying oven.

14. A method of preparing a battery cathode electrode, comprising the steps of:
1) pre-treating a cathode material in a first aqueous solution comprising water and having a pH from about 5.0 to about 7.5 to form a first suspension;
2) drying the first suspension to obtain a pre-treated cathode material;
3) dispersing the pre-treated cathode material, a conductive agent, and a binder material in a second aqueous solution to form a slurry;
4) homogenizing the slurry by a homogenizer to obtain a homogenized slurry;
5) applying the homogenized slurry on a current collector to form a coated film on the current collector; and
6) drying the coated film on the current collector to form the battery cathode electrode at a temperature from about 45° C. to about 90° C. for a time period from about 1 minute to about 15 minutes;

wherein the amount of water in the first aqueous solution is at least 50% and wherein the amount of water in the second aqueous solution is at least 90%;

wherein the cathode material is selected from the group consisting of $LiCoO_2$, $LiNi_xMn_yO_2$, $Li_{1+z}Ni_xMn_yCo_{1-x-y}O_2$, $LiNi_xCo_yAl_zO_2$, $LiMnO_2$, $LiMn_2O_4$, $LiFePO_4$, and combinations thereof, wherein each x is independently from 0.3 to 0.8; each y is independently from 0.1 to 0.45; and each z is independently from 0 to 0.2;

wherein the conductive agent is selected from the group consisting of carbon, carbon black, graphite, expanded graphite, graphene, graphene nanoplatelets, carbon fibers, carbon nano-fibers, graphitized carbon flake, carbon tubes, carbon nanotubes, activated carbon, mesoporous carbon, and combinations thereof; and wherein the binder material is latex.

15. The method of claim 14, wherein the first aqueous solution comprises one or more acids selected from the group consisting of $H_2SO_4$, $HNO_3$, HCOOH, $CH_3COOH$, $H_3C_6H_5O_7$, $H_2C_2O_4$, $C_6H_{12}O_7$, $C_4H_6O_5$, and combinations thereof.

16. The method of claim 14, wherein the first aqueous solution further comprises ethanol, isopropanol, methanol, acetone, n-propanol, t-butanol, or a combination thereof.

17. The method of claim 14, wherein the first suspension is dried by a double-cone vacuum dryer, a microwave dryer, or a microwave vacuum dryer.

18. The method of claim 14, wherein the conductive agent is pre-treated in a basic solution for a time period from about 30 minutes to about 2 hours and wherein the basic solution comprises a base selected from the group consisting of $H_2O_2$, LiOH, NaOH, KOH, $NH_3 \cdot H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, and combinations thereof.

19. The method of claim 14, wherein the conductive agent is dispersed in a third aqueous solution to form a second suspension prior to step 3).

20. The method of claim 14, wherein the binder material is dissolved in a fourth aqueous solution to form a resulting solution prior to step 3).

21. The method of claim 14, wherein the slurry further comprises a dispersing agent selected from the group consisting of ethanol, isopropanol, n-propanol, t-butanol, n-butanol, lithium dodecyl sulfate, trimethylhexadecyl ammonium chloride, alcohol ethoxylate, nonylphenol ethoxylate, sodium dodecylbenzene sulfonate, sodium stearate, and combinations thereof.

22. A method of preparing a battery cathode electrode, comprising the steps of:

1) pre-treating a cathode material in a first aqueous solution comprising water and having a pH from about 5.0 to about 7.5 to form a first suspension;
2) drying the first suspension to obtain a pre-treated cathode material;
3) dispersing the pre-treated cathode material, a conductive agent, and a binder material in a second aqueous solution to form a slurry;
4) homogenizing the slurry by a homogenizer to obtain a homogenized slurry;
5) applying the homogenized slurry on a current collector to form a coated film on the current collector; and
6) drying the coated film on the current collector to form the battery cathode electrode at a temperature from about 45° C. to about 75° C. for a time period from about 1 minute to about 15 minutes;
wherein the cathode material is selected from the group consisting of $LiCoO_2$, $LiNi_xMn_yO_2$, $Li_{1+z}Ni_xMn_yCo_{1-x-y}O_2$, $LiNi_xCo_yAl_zO_2$, $LiMnO_2$, $LiMn_2O_4$, $LiFePO_4$, and combinations thereof, wherein each x is independently from 0.3 to 0.8; each y is independently from 0.1 to 0.45; and each z is independently from 0 to 0.2;
wherein the conductive agent is selected from the group consisting of carbon, carbon black, graphite, expanded graphite, graphene, graphene nanoplatelets, carbon fibers, carbon nano-fibers, graphitized carbon flake, carbon tubes, carbon nanotubes, activated carbon, mesoporous carbon, and combinations thereof; and
wherein the binder material is a mixture of styrene-butadiene rubber and carboxymethyl cellulose.

23. The method of claim 22, wherein the first aqueous solution comprises one or more acids selected from the group consisting of $H_2SO_4$, $HNO_3$, HCOOH, $CH_3COOH$, $H_3C_6H_5O_7$, $H_2C_2O_4$, $C_6H_{12}O_7$, $C_4H_6O_5$, and combinations thereof.

24. The method of claim 22, wherein the first aqueous solution further comprises ethanol, isopropanol, methanol, acetone, n-propanol, t-butanol, or a combination thereof.

25. The method of claim 22, wherein the first suspension is dried by a double-cone vacuum dryer, a microwave dryer, or a microwave vacuum dryer.

26. The method of claim 22, wherein the conductive agent is pre-treated in a basic solution for a time period from about 30 minutes to about 2 hours and wherein the basic solution comprises a base selected from the group consisting of $H_2O_2$, LiOH, NaOH, KOH, $NH_3 \cdot H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, and combinations thereof.

27. The method of claim 22, wherein the conductive agent is dispersed in a third aqueous solution to form a second suspension prior to step 3).

28. The method of claim 22, wherein the binder material is dissolved in a fourth aqueous solution to form a resulting solution prior to step 3).

29. The method of claim 22, wherein the slurry further comprises a dispersing agent selected from the group consisting of ethanol, isopropanol, n-propanol, t-butanol, n-butanol, lithium dodecyl sulfate, trimethylhexadecyl ammonium chloride, alcohol ethoxylate, nonylphenol ethoxylate, sodium dodecylbenzene sulfonate, sodium stearate, and combinations thereof.

* * * * *